Apr. 3, 1923.  1,450,598
E. J. KEARNEY
SLIDE ACTUATING MECHANISM
Filed Aug. 3, 1918  4 sheets-sheet 1

Apr. 3, 1923.
1,450,598
E. J. KEARNEY
SLIDE ACTUATING MECHANISM
Filed Aug. 3, 1918          4 sheets-sheet 2
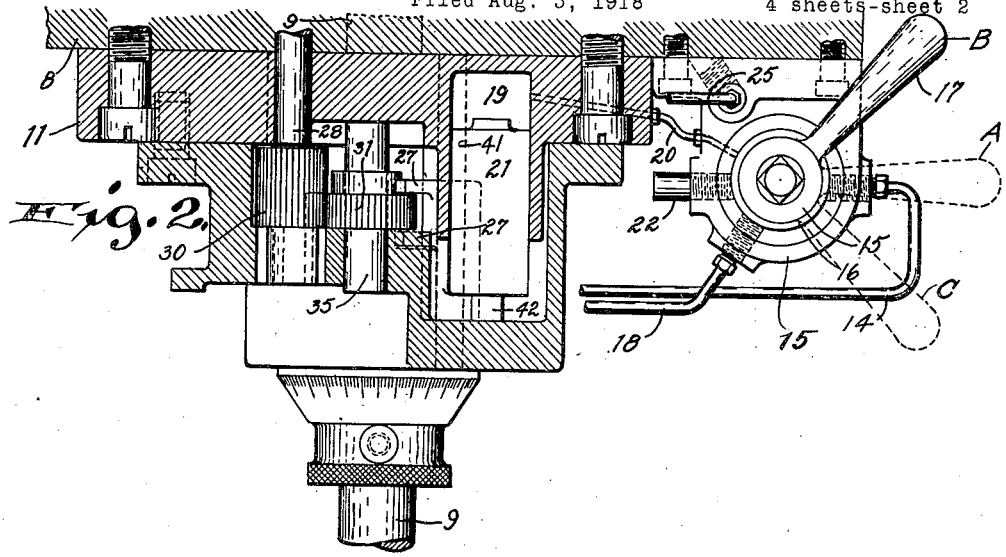
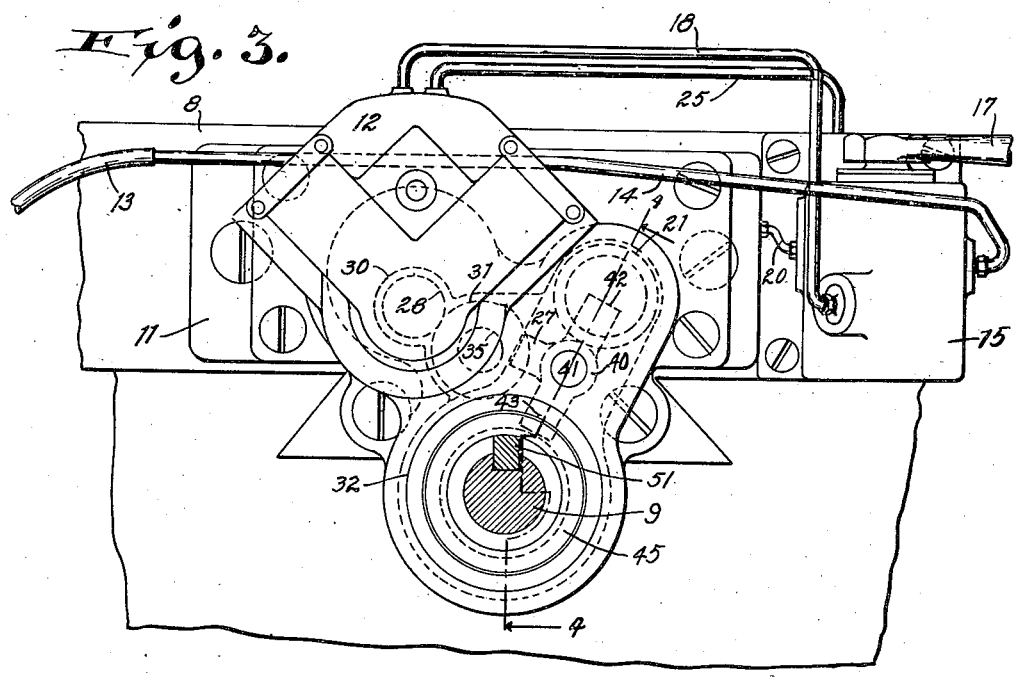
WITNESSES:
INVENTOR
Edward J. Kearney
BY
ATTORNEYS Apr. 3, 1923.

E. J. KEARNEY 1,450,598

SLIDE ACTUATING MECHANISM

Filed Aug. 3, 1918

WITNESSES:

INVENTOR

Edward J. Kearney

BY

Erwin & Wheeler

ATTORNEYS

Apr. 3, 1923.

E. J. KEARNEY 1,450,598

SLIDE ACTUATING MECHANISM

Filed Aug. 3, 1918   4 sheets-sheet 4

Edward J. Kearney
INVENTOR
BY
ATTORNEYS.

Patented Apr. 3, 1923.

1,450,598

UNITED STATES PATENT OFFICE.

EDWARD J. KEARNEY, OF WAUWATOSA, WISCONSIN, ASSIGNOR TO KEARNEY & TRECKER CORPORATION, OF WEST ALLIS, WISCONSIN, A CORPORATION OF WISCONSIN.

SLIDE-ACTUATING MECHANISM. REISSUED

Application filed August 3, 1918. Serial No. 248,155.

*To all whom it may concern:*

Be it known that I, EDWARD J. KEARNEY, a citizen of the United States, residing at Wauwatosa, county of Milwaukee, and State of Wisconsin, have invented new and useful Improvements in Slide-Actuating Mechanism, of which the following is a specification.

My invention relates to improvements in slide actuating mechanism for milling machines.

The object of my invention is to provide convenient means for utilizing a motor to actuate the feed screw of the work table or carriage in order that the table may be shifted rapidly for feeding-in and work-removing operations.

These feed screws have ordinarily been actuated manually by means of a hand wheel, except during cutting operations, at which times the screw is connected up with and driven from a main driving shaft or wheel through knuckle jointed transmission shafting or other complex connections adapted to permit the desired vertical and transverse adjustments of the work table without disconnecting the power.

Flexible shafts or equivalent power transmitting connections are reasonably satisfactory as a means for transmitting slow movements to the feed screw and work table, but they are not well adapted for the transmission of quick movements such as are desirable for feeding-in or retracting work. Either change speed gearing, or independent shafting are required in such cases, and in either case, the structure of the milling machine is greatly complicated and the liability of injury to the workmen or a breakdown or impairment of the working parts is increased.

For these reasons, it has been customary to operate the feed screw exclusively by means of a hand wheel for feeding-in or work retracting movements of the table, the power connections being employed only for the slow movements of the table required during cutting operations, notwithstanding the fact that manual feeding-in and retracting movements are too slow to suit the requirements of modern machine shop practice.

Specifically, therefore, the object of my invention is to provide means for utilizing an independently operated motor for actuating the work table during feeding-in and work retracting operations, or at least during the major portion of such operations, without interfering with the use of the hand wheel when such motor is disconnected. It is also my object to provide means whereby the relation of the motor to the feed screw will not be affected by vertical adjustments or transverse adjustments of the work table or its supporting slides, this object being accomplished in the construction illustrated by mounting the motor to travel with the work table in one or more of its adjusting movements, and preferably upon the table itself.

I preferably provide means whereby the motor will be automatically placed in driving connection with the screw when the motor is connected with the source of power. I also prefer to provide means for automatically disconnecting the hand wheel, which otherwise would acquire considerable momentum, thereby endangering the workman, and interfering with proper control by keeping the screw in motion after the motor has been disconnected. But after the motor has stopped, I prefer to allow the workman to manually re-connect the hand wheel, since in the construction shown this cannot be done without disconnecting the motor, and automatic means for shifting the connections in this direction are unnecessary.

In a milling machine, the work table is vertically adjustable. Also a set of superposed slides are usually employed, whereby vertical, transverse and longitudinal movements become possible in order that the work may be carried into the desired relation to the cutting tool. By mounting the motor upon the end of the work table in operative relation to the table actuating screw, and by supplying the power thru a flexible connection, such as a pipe or hose in cases where an air motor is employed, or a flexible cord in case electrical power is employed, I am able to supply the power to the motor without difficulty, notwithstanding the various movements above mentioned.

In the drawings—

Figure 2 is a detail view of my screw actuating attachment, partly in plan and partly in section, exposing the motion transmitting and shifting mechanism and a fragment of the table operating screw being illustrated.

Figure 3 is a fragmentary side elevation showing my improved attachment secured to the end of the main slide or work table, in operative relation to the feed screw, the latter being shown in cross section.

Like parts are identified by the same reference characters thruout the several views.

Figure 1:
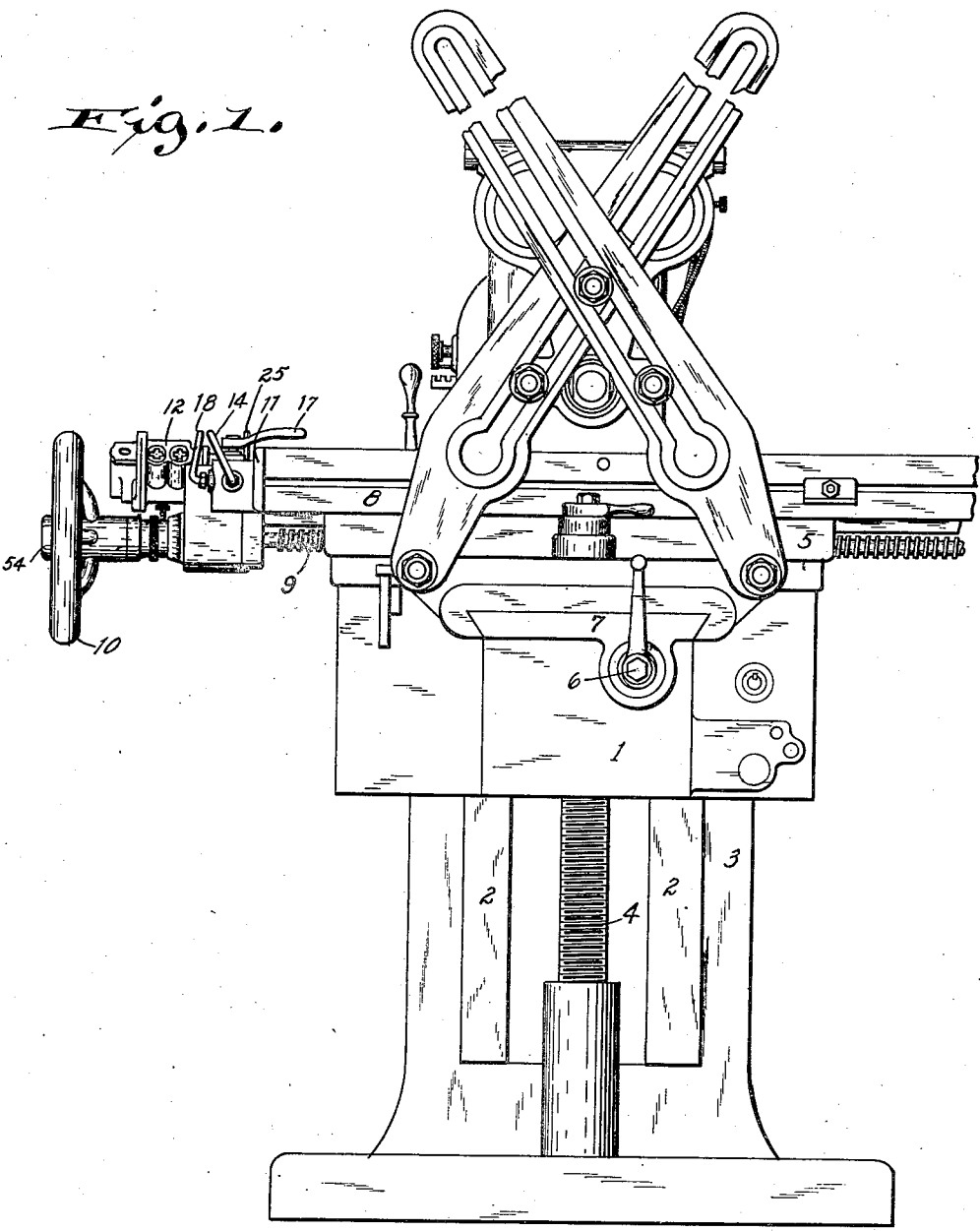
Figure 1 is a general view in front elevation of a milling machine to which my invention is applied.

A vertically movable slide 1 is mounted to travel in guides 2 projecting from the column 3, the guides being dove-tailed in cross section, and this slide being actuated by a vertically disposed screw 4. A transversely movable slide 5 is actuated by a screw 6, this slide 5 having a dove-tailed member 7 adapted to travel in a suitable cross channel formed in the vertically movable slide 1.

A main slide or work table 8 is mounted for movement on the slide 5 at right angles to the direction in whch the slide 5 travels, the table moving along its own longitudinal axis. This carriage or work table 8 is actuated by means of a screw 9 which may be manually driven by a hand wheel 10. All of these parts may be of any ordinary construction except as hereinafter described.

The motor 12 is mounted upon an extension or attachment 11 which is secured to the left hand end of the carriage 8 adjacent to the hand wheel 10. It may be assumed to be a reversible compressed air motor of ordinary construction and therefore no detailed description is deemed necessary. Power is applied to the motor thru a flexible hose 13 and duct 14 leading from a source of compressed air supply to a valve chamber 15 forming part of the attachment and in which a valve 16 is mounted and operated manually by means of a lever 17. When the valve 16 is adjusted to the position B in which it is illustrated in Figure 2, air is supplied to the motor thru duct 18 and is also supplied to a cylinder 19 thru a duct 20 to actuate a plunger 21 and operate the gear shifting mechanism as hereinafter explained. When the valve lever 17 is swung to the middle or neutral position A, indicated by dotted lines in Figure 2, the air supply to the motor will be cut off and air will be permitted to exhaust from cylinder 19 thru a port 22 in the valve chamber.

When lever 17 is swung to the position C also indicated by dotted lines in Figure 2, air will be supplied to the motor thru duct 25 and the motor will then be driven in the opposite direction from that in which it runs when lever 17 is in the full line position and air is being supplied to the motor thru duct 18. Air will also be supplied to cylinder 19 thru duct 20, the valve 16 having two ports, one adapted for registry with duct 20 when the valve lever is in the full line position B, and the other port being adapted for registry with said duct 20 when the valve lever is in position C.

Figure 4:
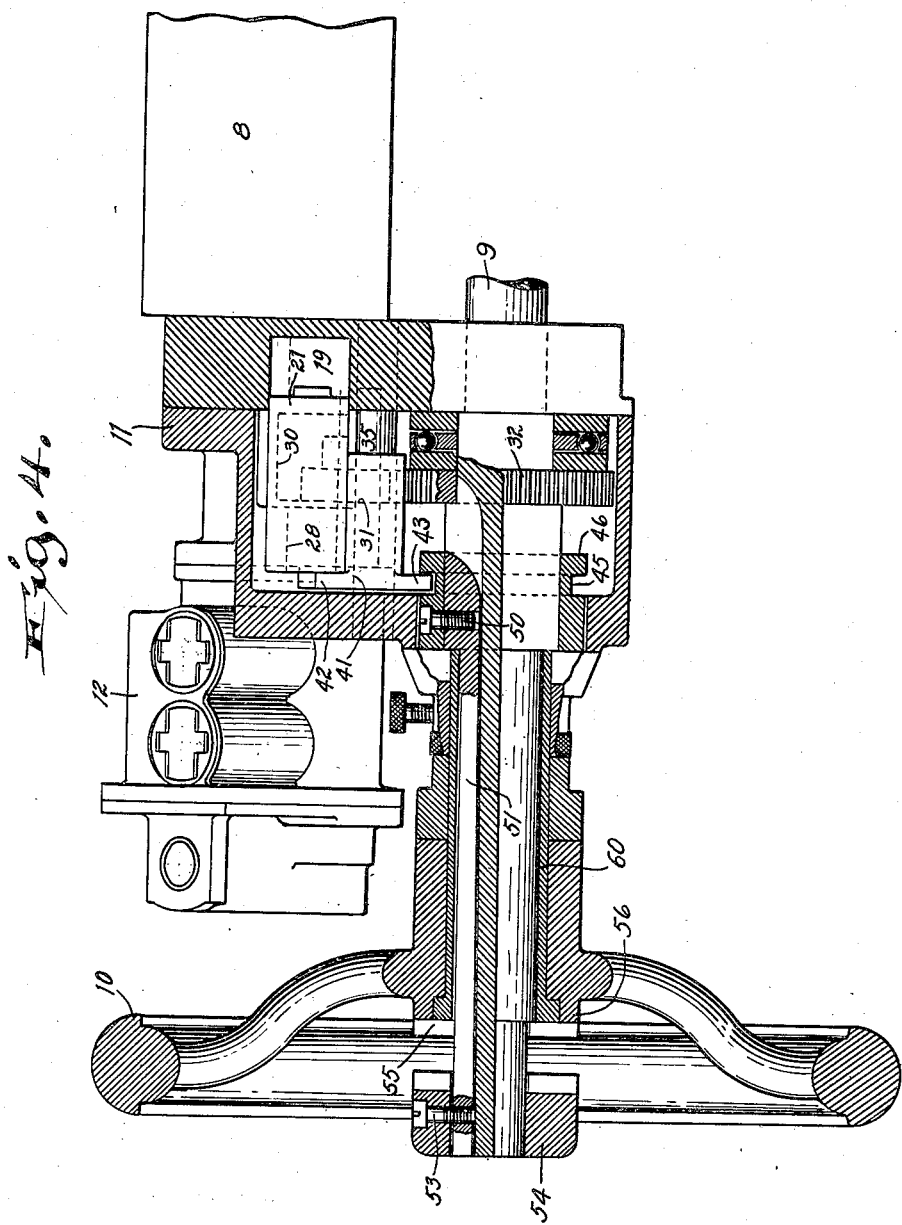
Figure 4 is a sectional view drawn generally on line 4—4 of Figure 3.
Figure 5:
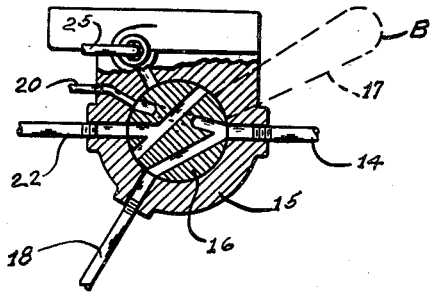
Figures 5, 6 and 7 are sectional views illustrating, diagrammatically, a possible construction of the valve described herein.
Figure 6:
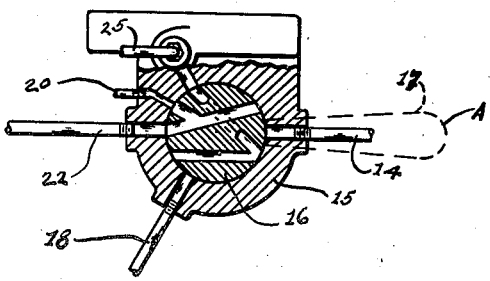
Figure 7:
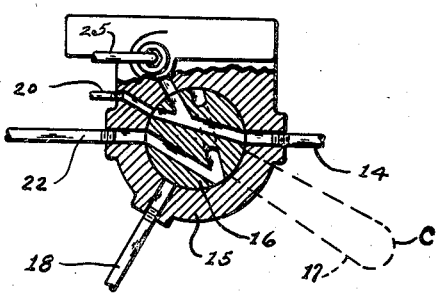

The motor shaft 28 is adapted to transmit motion to the screw 9 thru the gear wheels 30, 31, and 32, the latter being mounted upon screw shaft 9 to which it is keyed. The gear wheel 31 is adapted to slide longitudinally of its supporting shaft 35 into and out of mesh with the gear wheel 32, but it remains continuously in mesh with gear wheel 30 on the motor shaft, this gear wheel being elongated. Gear wheel 31 is normally out of mesh with the gear wheel 32 but when the valve 16 is operated to turn on the power to the motor 12, air under pressure will also be supplied to the cylinder 19 as above explained, thereby driving plunger 21 outwardly and this motion is transmitted thru a shifting fork 27 to move gear wheel 31 to the position in which it is illustrated in Figures 2 and 4. Thereupon the motor will transmit rapid motion to the screw 9 thru the train of gears 30, 31, and 32, as above explained. This will continue until the power supply is shut off by operating the handle 17 to its dotted line position A, thereby shifting valve 16 to a position where it cuts off the supply of air to the motor.

The fork 27 is rigidly connected with a cross head having a sleeve 40 mounted to slide upon a guide rod 41. This cross head has one arm 42 in the path of the plunger 21 and another arm 43 projects downwardly and loosely engages in an annular channel 45 in a shifting collar 46 mounted to slide on shaft 9 and rigidly connected by a screw 50 with a sliding key 51 movably mounted in a longitudinal groove in said shaft 9. The outer end of this key 51 is connected by a screw 53 with a clutch member 54 adapted to engage clutch jaws 55 on the hub 56 of the hand wheel 10, said hub being rotatably mounted on a sleeve bearing member 60 thru which shaft 9 passes. It is therefore obvious that, when valve handle 17 is swung to the full line position in which it is illustrated in Figure 2, the motor will not only be started, but plunger 21 will be simultaneously shifted to move gear wheel 31 into motion transmitting position and to also shift clutch member 54 outwardly to the position in which it is illustrated in Figure 4, thereby allowing the screw shaft 9 to rotate freely without actuating the hand wheel. Owing to the fact that the hub of the hand wheel is mounted upon the stationary sleeve 60, there will be no tendency for a transmission of motion from the screw shaft to the hand wheel by friction.

When the valve handle 17 is swung to the position A indicated by dotted lines in Figure 2, power is cut off from the motor and the air is simultaneously permitted to exhaust from cylinder 19. Thereupon the operator may connect up the hand wheel 10 with the screw shaft 9 by pushing inwardly on clutch member 54. When the clutch member 54 is pushed inwardly, motion will be transmitted to gear wheel 31 to shift the latter out of operative position thru the medium of the key 51, cross head 40, and forked shifting member 27.

I claim—

1. In a milling machine, the combination with the work table and its actuating screw, of a motor, a manually operable member, means for interchangeably connecting the motor and said member operatively to the screw, and means whereby said member will normally remain at rest while the screw is motor actuated.

2. The combination with the work table of a milling machine, of a screw for actuating the same longitudinally, a screw operating hand wheel, an independently operating screw actuating motor and a motor controlling lever adapted to automatically connect up the motor with the screw and simultaneously disconnect the hand wheel.

3. The combination with the work table of a milling machine, of a screw for operating the same longitudinally, a motor secured to one end of the work table, and shift gear mechanism for connecting and disconnecting the motor into and out of operative relation to the screw.

4. The combination with the work table of a milling machine, of a transversely movable slide, a screw connected therewith and adapted to actuate the work table longitudinally, a screw actuating motor mounted on the work table and normally disconnected from the screw, a motor controlling lever also mounted on the table, and means controlled by the motor controlling lever for connecting the motor with the screw simultaneously with a motor starting operation.

5. The combination with the work table of a milling machine, of a transversely movable slide, a screw connected therewith and adapted to actuate the work table longitudinally, a screw actuating motor mounted on the work table and normally disconnected from the screw, a motor controlling lever also mounted on the work table, means controlled by the motor controlling lever for connecting the motor with the screw simultaneously with a motor starting operation, said screw being provided with a manually operable hand wheel, and means for disconnecting the hand wheel when the motor is started.

6. In a milling machine, the combination with the work table and its actuating screw, of a screw actuating motor secured to one end of the work table and adapted to be operatively connected and disconnected from the screw, said motor being provided with a flexible power transmitting connection, whereby power may be supplied to the motor under all conditions of work table adjustment.

7. The combination with a milling machine work table provided with means for adjusting the same vertically, of a motor mounted on the table, and manually controlled means for utilizing the motor to actuate the table horizontally.

8. The combination with a milling machine work table provided with motion transmitting mechanism for actuating said table at working speed along various lines of movement, of a source of power and independent motion transmitting mechanism distinct from said first named mechanism for actuating said table for adjustment to and fro along one of said lines of movement at a relatively rapid speed, whereby complicated motion transmitting connections are avoided.

9. The combination with a milling machine work table provided with means for adjusting same vertically, of a motor in fixed relation to the work table, connections adapted to utilize the power of the motor to actuate the table in one or more directions, means for manually actuating the work table and power transmitting connections for actuating the same slowly during cutting operations, said power transmitting connections, manual connections, and motor connections being adapted for interchangeable use.

10. In a milling machine, the combination with a work table, of a table actuating motor secured thereto, and manual means for rendering the motor inoperative to actuate the table.

11. In a milling machine the combination with a bodily movable element, of a work table mounted for an independent sliding movement transversely of said element, driving connections between said table and said element, and a motor mounted for bodily movement with said element and arranged to actuate said driving connection whereby said table may be caused in any position of said element to slide transversely thereof without the use of complicated driving connections.

12. In a milling machine, a work table slidably adjustable in a plurality of directions and provided with a motor adapted to travel with it along one line of adjustment and to actuate the table from any position of such adjustment along another line of adjustment.

In testimony whereof I affix my signature in the presence of two witnesses.

EDWARD J. KEARNEY.

Witnesses:
LEVERETT C. WHEELER,
A. L. PRYOR.